United States Patent [19]
Taga et al.

[11] Patent Number: 5,872,647
[45] Date of Patent: Feb. 16, 1999

[54] OPTICAL TRANSMITTING TERMINAL

[75] Inventors: Hidenori Taga; Shu Yamamoto; Noboru Edagawa, all of Saitama; Shigeyuki Akiba, Tokyo, all of Japan

[73] Assignee: Kokusai Denshin Denwa Kabushiki Kaisha, Tokyo, Japan

[21] Appl. No.: 760,411

[22] Filed: Dec. 4, 1996

[30] Foreign Application Priority Data

Dec. 27, 1995 [JP] Japan .................................. 7-351989

[51] Int. Cl.$^6$ ................................................ H04B 10/04
[52] U.S. Cl. ........................ 359/184; 359/156; 359/183; 359/181; 385/3
[58] Field of Search ................................ 359/122, 156, 359/173, 181, 184, 188, 183; 385/11, 24, 2, 3, 4

[56] References Cited

U.S. PATENT DOCUMENTS 5,127,066  6/1992  Poggiolini .................................. 385/24
5,611,005  3/1997  Heismann et al. .......................... 385/11

OTHER PUBLICATIONS

"IEEE Photonolgy Technololgy Letters", F. Heismann, et al., vol. 6, No. 9, pp. 1156–1158, 1994.
"IOOC–95" paper, F. Heismann, FD1–2, 1995.
Published Unexamined Patent Application No. 283804/1993.

Primary Examiner—Rafael Bacares
Attorney, Agent, or Firm—Westman, Champlin & Kelly, P.A.

[57] ABSTRACT

The object of the present invention is to provide an optical transmitter which enables the reduction of the strong dependency of the transmission characteristic on the high-speed polarization scrambler driving signal phase. The light outputted from a light source is converted to a RZ pulse by an electro-absorption modulator. The RZ pulse is modulated by a data modulator, and the polarization thereof is scrambled in a high-speed electro-optic polarization scrambler and outputted from the output terminal thereof. Since, in the present invention, the light is once changed to a RZ pulse, the strong dependency of the optical signal transmission characteristic on the high-speed polarization scrambler driving signal phase can be reduced. Further, if the phase of the RZ pulse in the NRZ modulation signal is made to synchronize with the rising edge or the falling edge of the NRZ signal, the dependency on the high-speed polarization scrambler driving signal phase can be further reduced.

6 Claims, 5 Drawing Sheets

FIG. 6
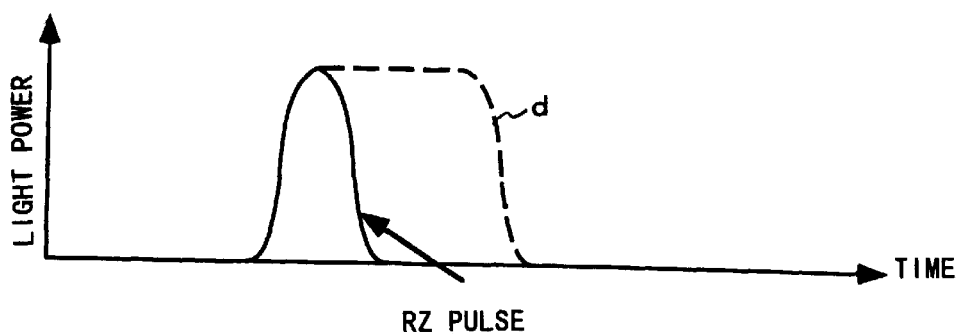
FIG. 7
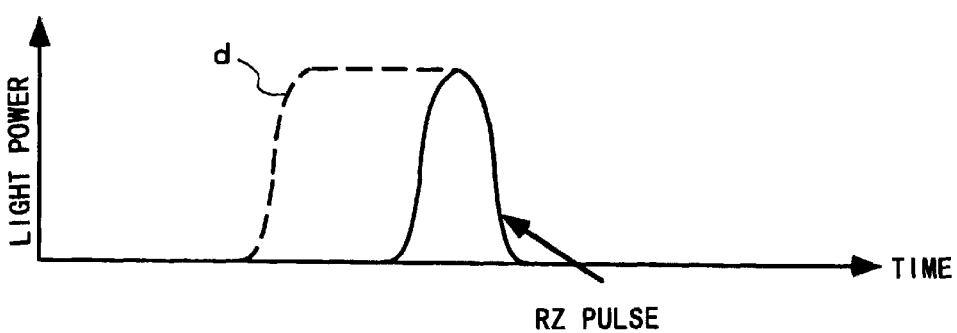
FIG. 8
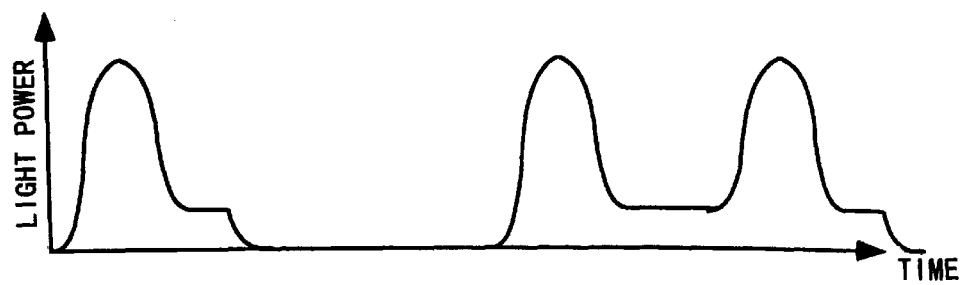
FIG. 9
| PULSE WIDTH (ps) | BIAS VOLTAGE (V) | DRIVING VOLTAGE (V) | EXTINCTION RATIO (dB) |
|---|---|---|---|
| 60 | 1.5 | 3.2 | 13 |
| 150 | 0.8 | 1.8 | 10 |
| 150 | 0.5 | 1.1 | 5 |

OPTICAL TRANSMITTING TERMINAL

BACKGROUND OF THE INVENTION

1. Field of the Invention

The present invention is related to an optical transmitting terminal, and particularly to an optical transmitting terminal used in an optical fiber transmission system in which light amplifiers are used as optical repeaters.

2. Description of the Related Art

In the optical communication system in which NRZ optical pulses are transmitted on an optical transmission path in which many optical repeaters are interconnected, it is known that the transmission characteristic is deteriorated by the accumulation of minute polarization dependent factors inherent in the optical amplifiers. As a technique for suppressing such polarization dependent factors to improve the transmission characteristic, a high-speed electro-optic polarization scrambler is effective, in which polarization is scrambled at a speed equal to or higher than a frequency which is the same as the bit rate (reference: F. Heismann, et al., IEEE Photon, Technol., Lett., vol. 6, no. 9, pp 1156–1158, 1994). Although it was reported that the best transmission characteristic is provided when the frequency of the high-speed electro-optic polarization scrambler is the same as the bit rate and synchronous with the modulation signal (reference: F. Heismann, IOOC'95, Paper FD1-2, 1995), the study by the present inventors proved that the characteristic might be significantly degraded depending on the phase of the signal applied to the high-speed electro-optic polarization scrambler.

FIG. 10 is an example of the result of a measurement carried out with 5.3 Gbps, in which the abscissa represents the relative signal phase of the high-speed polarization scrambler driving signal, and the ordinate represents the relative Q-value after a transmission over a long distance (8800 km). It is seen that the relative Q-value after the transmission changes as much as about 3 dB if the phase of the scrambler driving signal is changed in the range of about 180 ps (pico seconds) corresponding the one bit period. This change, if replaced by code error rate, is a large change of about six orders from about $10^{-7}$ to $10^{-13}$, and thus it is understood that a strict phase adjustment of the high-speed electro-optic polarization scrambler is important for keeping the transmission characteristic good.

However, to perform the phase adjustment of the high-speed electro-optic polarization scrambler, it was conventionally inevitable to send out an optical signal from an optical transmitter having the high-speed electro-optic polarization scrambler, perform a transmission characteristic measurement by the optical signal after transmitted over a long distance, for instance about 10000 km, and evaluate the transmission characteristic. Thus, there was a problem that the phase adjustment of the high-speed electro-optic polarization scrambler was difficult.

SUMMARY OF THE INVENTION

It is an object of the present invention to eliminate the above described problem of the prior art, and provide an optical transmitter which enables the reduction of the strong dependency of the transmission characteristic on the high-speed polarization scrambler driving signal phase, which was inevitable in the optical transmitter consisting of the NRZ optical pulse and the high-speed electro-optic polarization scrambler. Further, it is another object of the present invention to provide an optical transmitter in which the margin of the high-speed electro-optic polarization scrambler phase adjustment is increased.

As a result of the experiment and study by the inventors, it was found out that the dependency on the high-speed polarization scrambler driving signal phase can be reduced by using the RZ pulse instead of the NRZ pulse. The present invention is an optical transmitting terminal for use with optical digital communication, characterized by comprising a light source, a pulse generation unit for generating a RZ pulse with the light from the light source, a modulation unit for modulating the RZ pulse with a NRZ data signal, the data signal frequency applied to the modulation unit being synchronous with the high-speed polarization scrambler driving signal frequency, and a high-speed electro-optic polarization scrambler for scrambling the polarization state of the modulated optical signal, whereby the RZ pulse generation of the light from the light source is performed.

BRIEF DESCRIPTION OF THE DRAWING

FIG. 6 is a waveform diagram for explaining the operation of the third embodiment of the present invention.

FIG. 7 is a waveform diagram for explaining the operation of the fourth embodiment of the present invention.

FIG. 8 is a waveform diagram for explaining the operation of the fifth embodiment of the present invention.

FIG. 9 is a diagram showing an example of the generation conditions of the RZ pulse.

DETAILED DESCRIPTION OF THE PREFERRED EMBODIMENT

Figure 1:
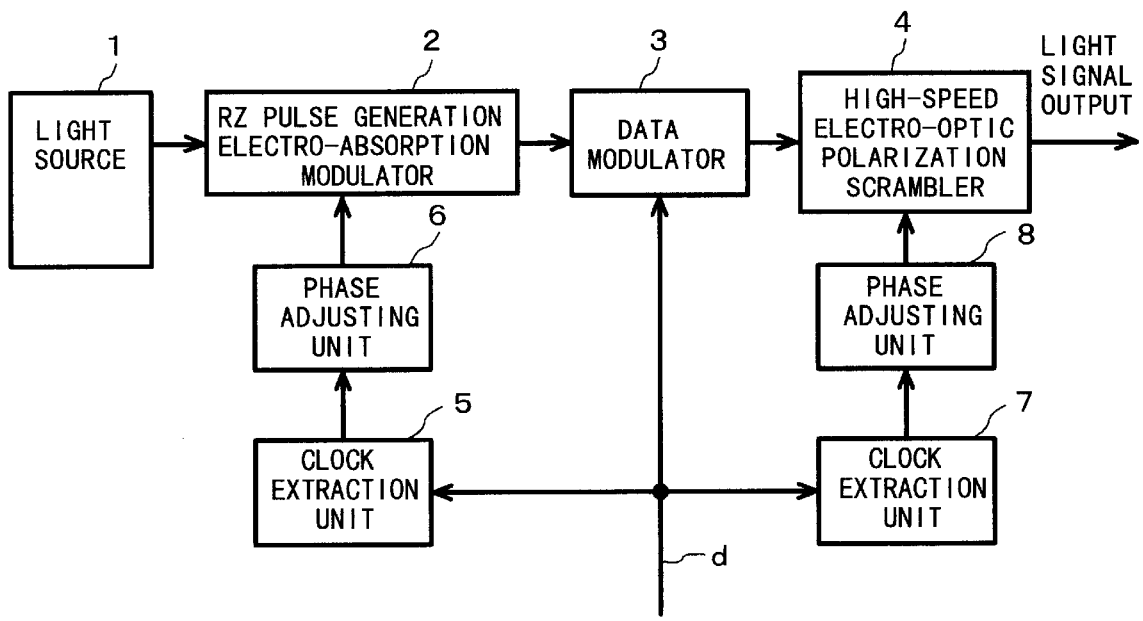
FIG. 1 is a block diagram showing the construction of an embodiment of the present invention.

Now, the present invention is described in detail with reference to the drawing. FIG. 1 shows a block diagram of the optical transmitting terminal of an embodiment of the present invention. In the figure, the light outputted from a light source 1 is changed to a RZ pulse by a RZ pulse generation electro-absorption modulator 2 driven by a sinusoidal voltage, and then undergoes a data modulation by a data modulator 3 using a NRZ data signal d. Further, the polarization of the light is scrambled by a high-speed electro-optic polarization scrambler 4, and the light signal is outputted from the output terminal thereof. Clock extraction units 5 and 7 extract clocks from the NRZ data signal d. A phase adjusting unit 6 adjusts the phase of the electric signal applied to the electro-absorption modulator 2 which performs the RZ pulse generation of the light from the light source 1. Further, a phase adjusting unit 8 functions to change the phase of the electric signal applied to the high-speed electro-optic polarization scrambler 4. In this embodiment, the phase adjusting unit 8 is not always necessary, and may be deleted. In addition, the RZ pulse generation electro-absorption modulator 2 is well known, and as an example, the apparatus described in Published Unexamined Patent Application No. 283804/1993 can be used. Further, the data modulator 3 is also well known, and as an example, "Bias-free APE 2.5 Gb/s Modulators" made by UTP (Uniphase Telecommunication Products) can be used.

Figure 2A:
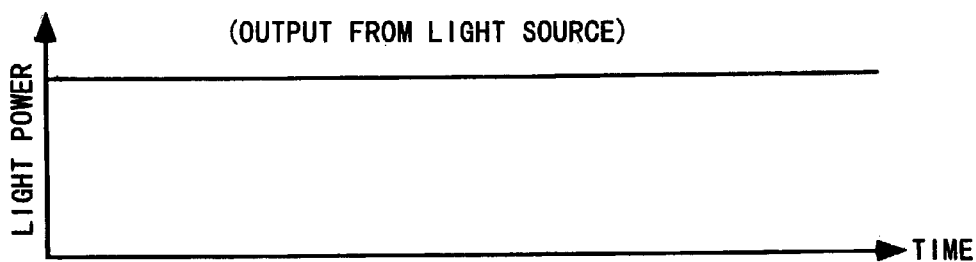
FIGS. 2A–2C are optical waveform diagrams for explaining a partial operation of this embodiment.
Figure 2B:
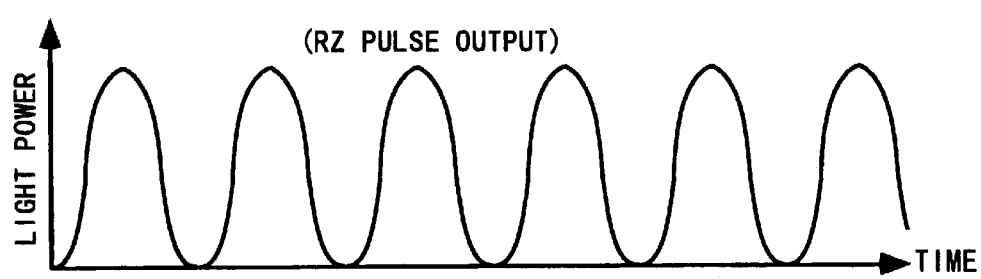
Figure 2C:
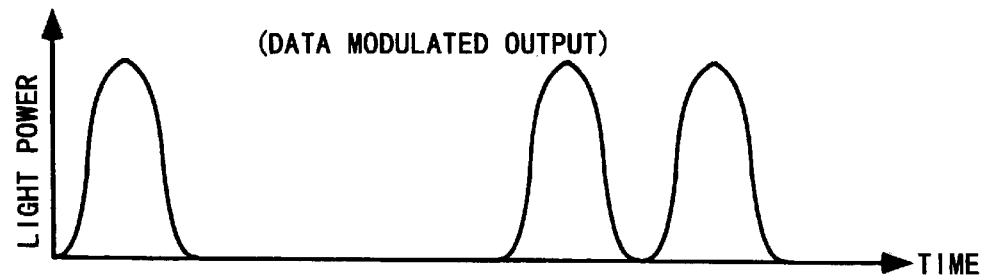

FIG. 2 shows a diagrammatic sketch of the optical waveforms for part of this embodiment, in which FIG. 2A diagrammatizes the waveform of the light outputted from the light source 1, FIG. 2B diagrammatizes the waveform of the light changed to a RZ pulse by the electro-absorption modulator 2, and FIG. 2C diagrammatizes the waveform of the light subjected to the data modulation by the data modulator 3. It was experimentally found out that the width of the RZ pulse is preferably 30–80% of one bit time, or about 60–160 ps. Although the RZ pulse can be generated by applying a sinusoidal voltage signal to the electroabsorption modulator 2, the RZ pulse having a pulse width within the above range can be generated under the conditions of FIG. 9. As shown, the RZ pulse having a pulse width of 60 ps for instance can be generated with a bias voltage of 1.5 V and a driving voltage of 3.2 V, and the extinction ratio becomes 13 dB. Here the extinction ratio is the power ratio between the peak and bottom of the RZ pulse.

In this embodiment, a light having a uniform intensity as shown in FIG. 2A is outputted from the light source 1. This light is converted to a RZ pulse by the electro-absorption modulator 2. The light converted to the RZ pulse is modulated by the data modulator 3, and the polarization of it is scrambled by the high-speed electro-optic polarization scrambler 4. The driving signal of the high-speed electro-optic polarization scrambler 4 was a sine or triangular wave having the same frequency as the transmission bit rate, and the phase of the high-speed electro-optic polarization scrambler 4 was changed in a predetermined step. When the optical signal obtained in this way was transmitted over a long distance (for instance, 8800 km) and the transmission characteristic was measured, the result as shown in FIG. 3 was obtained.

Figure 3:
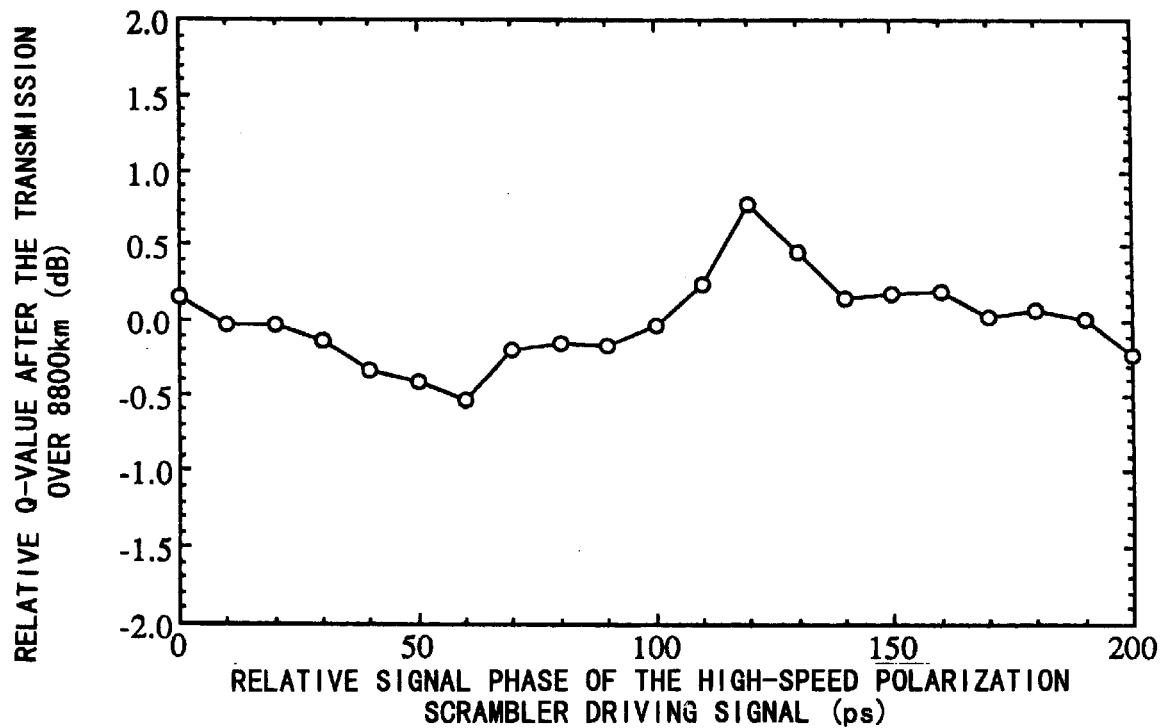
FIG. 3 is a diagram showing the transmission characteristic when the optical signal obtained by this embodiment was transmitted over a long distance.

FIG. 3 shows that the dependency of the transmission characteristic on the high-speed polarization scrambler driving signal phase was greatly suppressed. That is, even if the phase of the scrambler driving signal is varied within the range of about 180 ps (pico seconds) corresponding to one bit period, the change of Q can be suppressed to about 1.5 dB.

As described above, if a light is submitted to data modulation after once changed to a RZ pulse, the dependency of the transmission characteristic on the high-speed polarization scrambler driving signal phase is reduced, and the use of the optical transmitter of this embodiment enables the increase of the margin of the high-speed polarization scrambler phase adjustment.

Figure 4:
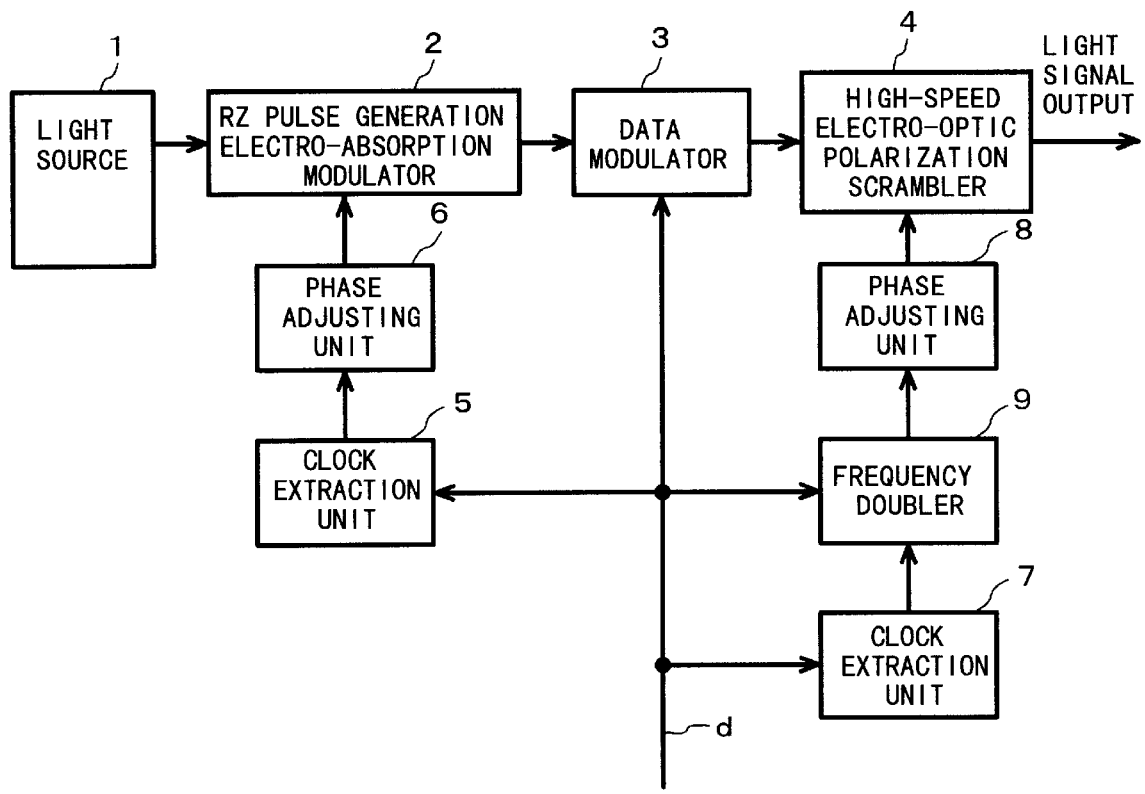
FIG. 4 is a block diagram showing the construction of the second embodiment of the present invention.

The second embodiment of the present invention is shown in FIG. 4. FIG. 4 is a block diagram showing the construction of the optical transmitter of the second embodiment. This embodiment is different from that of FIG. 1 in the point that a frequency doubler 9 is interposed between the clock extraction unit 7 and the phase adjusting unit 8 to make the frequency of the sine or triangular wave for driving the high-speed electro-optic polarization scrambler 4 twice as high as the transmission bit rate.

Figure 5:
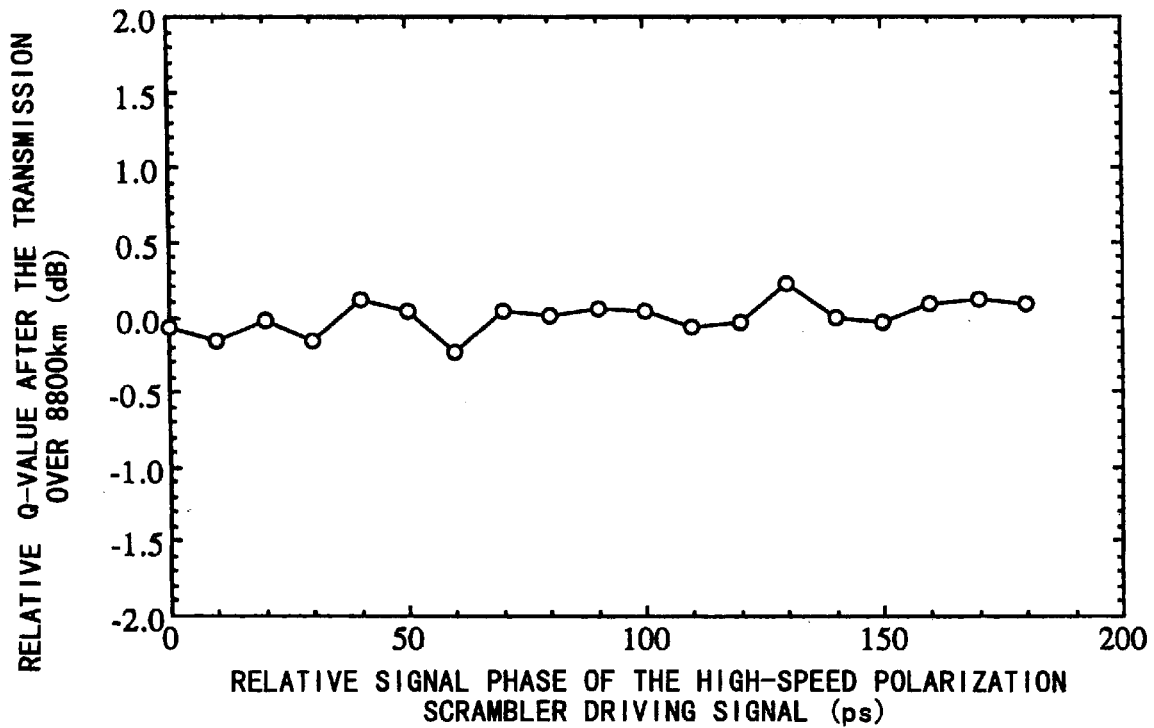
FIG. 5 is a diagram showing the transmission characteristic when the optical signal obtained by this embodiment was transmitted over a long distance.
Figure 10:
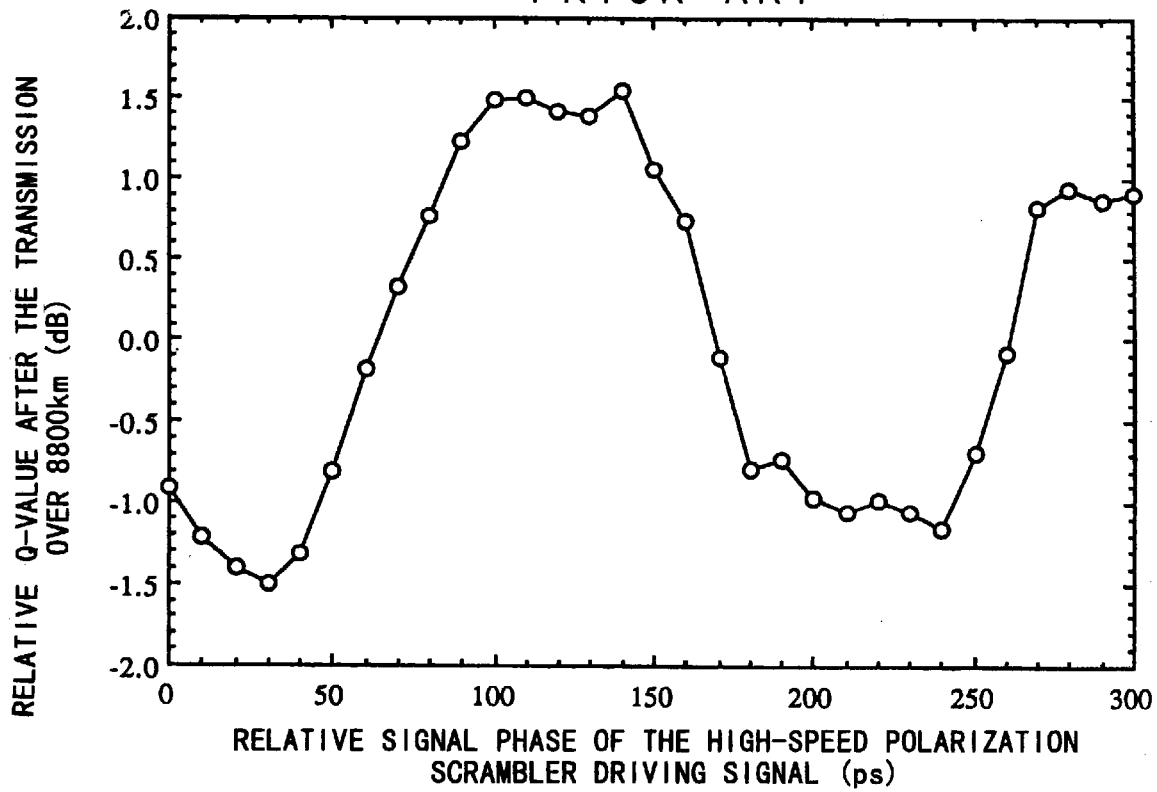
FIG. 10 is a diagram showing the transmission characteristic when the light signal obtained by the conventional apparatus was transmitted over a long distance.

In this embodiment, when the optical signal obtained through an operation similar to the first embodiment was transmitted for a long distance (for instance, 8800 km) and the transmission characteristic was measured, the result as shown in FIG. 5 was obtained. FIG. 5 shows an example of the result of the measurement performed with 5.3 Gbps, in which the abscissa represents the relative signal phase of the high-speed polarization scrambler driving signal, and the ordinate represents the relative Q-value after the transmission over a long distance (8800 km). It is seen that the dependency on the high-speed polarization scrambler phase was further reduced.

The third and fourth embodiments of the present invention are now described. The present inventors used the optical transmitting terminal of the construction of FIG. 1 or 4 to perform an experiment in which the phase of the phase adjusting unit 6 was changed continuously or stepwise at an interval of a predetermined phase value, and observed that the transmission characteristic could be improved when the rise of the RZ pulse synchronized with the rise of the NRZ data signal d as shown in FIG. 6, or when the fall of the RZ pulse synchronized with the fall of the NRZ data signal d as shown in FIG. 7.

Accordingly, the third embodiment of the present invention is characterized in that the rise of the RZ pulse is made to synchronize with the rise of the NRZ data signal d as shown in FIG. 6. Further, the fourth embodiment of the present invention is characterized in that the fall of the RZ pulse is made to synchronize with the fall of the NRZ data signal d as shown in FIG. 7.

Now, the fifth embodiment of the present invention is described. This embodiment is characterized by providing an optical transmitting terminal for an optical output in which the extinction of the RZ pulse is not completely performed. FIG. 8 diagrammatically shows the pulse waveform after a data modulation for the RZ pulse extinction ratio of 6 dB. According to the experiment by the present inventors, even if the RZ pulse was not completely extincted, much degradation of the transmission characteristic was not recognized, provided that the extinction ratio of the RZ pulse was, for instance, equal to or larger than 3 dB and equal to or smaller than 10 dB. This shows that the RZ pulse generation decreases the dependency on the high-speed polarization a scrambler driving signal phase. In accordance with this embodiment, it is not necessary to completely extinct the RZ pulse, and thus the condition setting of the electro-absorption modulator 2 can simply be made.

As obvious from the above description, in accordance with the present invention, the light from the light source is changed to a RZ pulse and then modulated with a NRZ data signal, and thus there is an advantage that the dependency of the transmission characteristic on the high-speed polarization scrambler driving signal phase can be greatly reduced. Accordingly, an optical signal output with a good transmission characteristic can easily be provided without performing the cumbersome work in the conventional method, in which an optical signal is sent out from an optical transmitter having a high-speed scrambler, a transmission characteristic measurement is performed with the optical signal after transmitted over a long distance, and the phase adjustment of the high-speed scrambler is made according to the evaluation of the transmission characteristic, hence leading to a very large practical advantage. Further, in accordance with the present invention, there is an advantage that the margin of the high-speed scrambler phase adjustment can be expanded.

What is claimed is:

1. An optical transmitting terminal for use with optical digital communication, comprising:

a light source, a pulse generation unit for generating a RZ pulse from the output light of said light source, a modulation unit for modulating said RZ pulse with a NRZ data signal, and a high-speed electro-optic polarization scrambler for scrambling the polarization state of the optical signal modulated in said modulator, using a high-speed polarization scrambler driving signal of a frequency synchronous with the frequency of said NRZ data signal.

2. An optical transmitting terminal as set forth in claim 1 wherein the driving signal of said high-speed electro-optic polarization scrambler is a sine wave of a frequency which is the same as or an integral multiple of the transmission bit rate.

3. An optical transmitting terminal as set forth in claim 1 wherein the driving signal of said high-speed electro-optic polarization scrambler is a triangular wave of a frequency which is the same as or an integral multiple of the transmission bit rate.

4. An optical transmitting terminal as set forth in claim 1 wherein the phase of said RZ pulse in the NRZ data signal is synchronous with the rising edge of said NRZ data signal.

5. An optical transmitting terminal as set forth in claim 1 wherein the phase of said RZ pulse in the NRZ data signal is synchronous with the falling edge of said NRZ data signal.

6. An optical transmitting terminal as set forth in claim 1 D wherein the extinction ratio of said RZ pulse is equal to or larger than 3 dB and equal to or smaller than 10 dB.

\* \* \* \* \*